United States Patent [19]
Devanney

[11] 3,774,330
[45] Nov. 27, 1973

[54] PROGRAMMED DISPLAY DEVICE OR THE LIKE

[75] Inventor: Raymond H. Devanney, Winsted, Conn.

[73] Assignee: Vanco, Inc., Hartford, Conn.

[22] Filed: Feb. 9, 1972

[21] Appl. No.: 224,859

[52] U.S. Cl. .................................... 40/36, 40/65
[51] Int. Cl. .................................... G09f 11/30
[58] Field of Search ............ 40/36, 28 C, 78–78.15, 40/63–65; 74/435

[56] References Cited
UNITED STATES PATENTS

| | | | |
|---|---|---|---|
| 3,080,668 | 3/1963 | Reali | 40/36 |
| 2,365,510 | 12/1944 | Barnes | 74/435 |
| 3,225,471 | 12/1965 | Hallburg | 40/36 |

Primary Examiner—Robert W. Michell
Assistant Examiner—L. R. Oremland
Attorney—Peter L. Costas

[57] ABSTRACT

A display device includes a number of image elements which may be selectively exposed in accordance with a predetermined program to provide, in cooperation with other such elements, several graphic presentations. A programming mechanism is provided to enable such operation, and includes a motor and transmission means for transferring drive motion from the motor to the means for moving the image elements.

22 Claims, 11 Drawing Figures

Patented Nov. 27, 1973

Patented Nov. 27, 1973

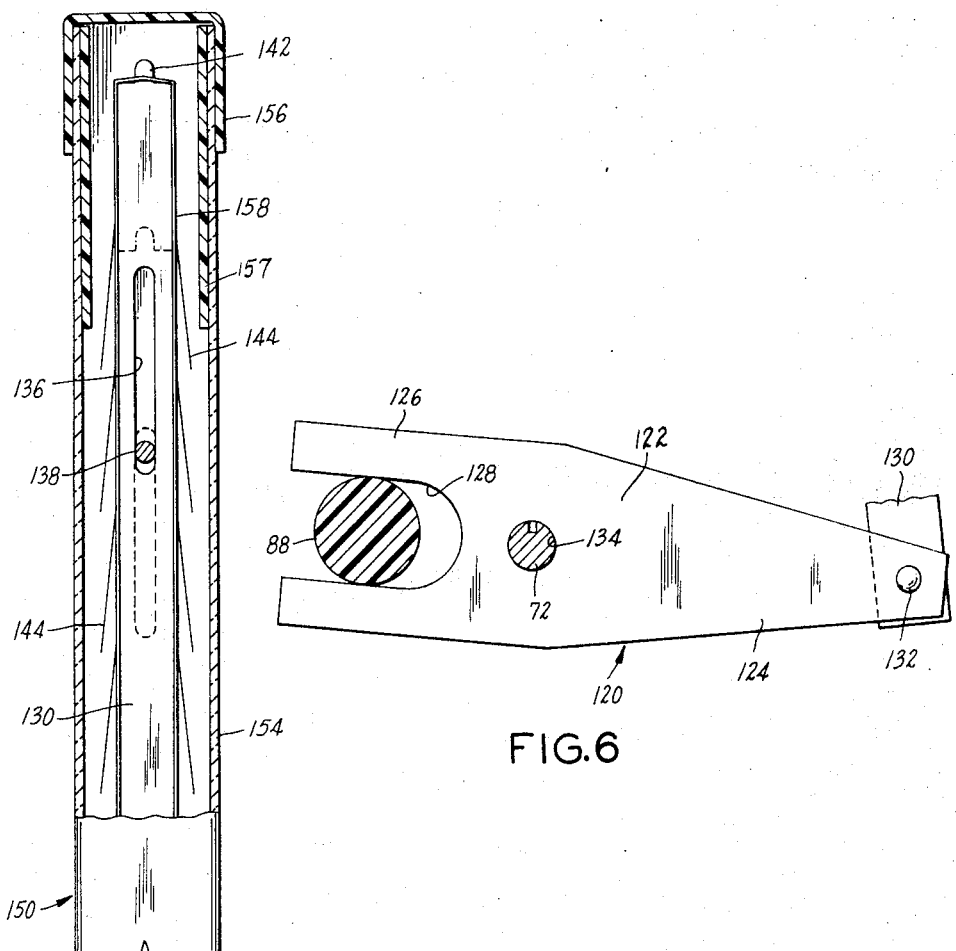
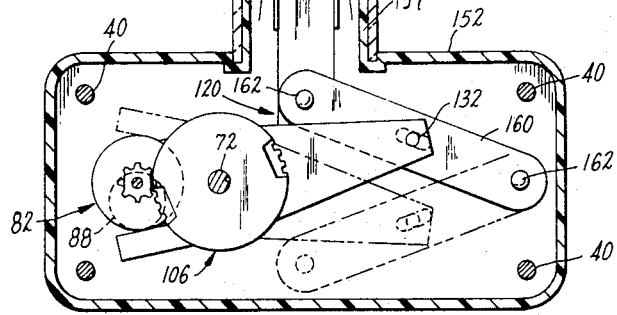
FIG.6
FIG. 11

Patented Nov. 27, 1973

PROGRAMMED DISPLAY DEVICE OR THE LIKE

BACKGROUND OF THE INVENTION

There are many instances in which it is advantageous to selectively present displays of pictorial or printed matter at a single location, and consequently the demand exists for a device that is capable of doing so automatically or semi-automatically on a continuous or intermittent basis. Among the many possible applications for such a device are its uses to present recurrently changing information (e.g., for daily menus, time schedules, as timing devices, etc.); to demonstrate the effects of changes in color or style, such as by altering the background or foreground of an overlay or silhouette; to present a sequence or series of advertisements, instructional materials, testing charts, etc.; and to provide a unique and dynamic display of color and design effects for advertising or amusement purposes.

Compact and convenient manually operated overlap dissolve-type devices for the presentation of a variety of graphic displays have heretofore been known, and have been proposed, for example, as a repository for a collection of maps. In addition, a variety of automated display devices hve heretofore been known which enable the relatively facile interchange of graphic presentations. However, it is not believed that any device of the present type has previously been available which operates in a smooth, effective, and well-controlled manner to display a selection of graphic matter on an automatic or semi-automatic basis, which can be used for dynamic and timed operation, and which is highly flexible in its applications by virtue of facile variation of its program of operation.

Accordingly, it is an object of the present invention to provide a novel display device which is capable of selectively exposing a variety of graphic presentations in sequence according to a predetermined program.

It is also an object of the invention to provide such a device which operates automatically or semi-automatically, on a continuous or intermittent basis, and in a well-controlled, smooth and effective manner.

A further object is to provide such a device which is adapted for diverse applications and a wide variety of displays, in which the elements providing the graphic presentations may be readily replaced, and which may be used to create highly unique and attractive visual effects.

Still another object is to provide such a device which is adapted for facile and extensive variation of its program to vary the mode of operation in a highly desirable manner.

SUMMARY OF THE DISCLOSURE

It has now been found that the foregoing and related objects of the present invention are readily attained in a programmed display device which comprises the combination of a chassis, a multiplicity of first generally planar image elements spaced across the chassis, and a plurality of additional generally planar image elements movably mounted thereon. Each of the additional image elements is superposed over at least one of the first image elements in a first position in which the additional image element is exposed to provide, in cooperation with other exposed image elements, a first graphic presentation and in which the "one" image element is substantially concealed thereunder. Means is provided for moving each of the additional image elements between the first position thereof and a second position in hwich the additional image element is concealed under another of the first image elements. The one image element concealed under the additional element in the first position is exposed in the second position to provide, in cooperation with other exposed image elements, an additional graphic presentation. The moving means for at least one of the additional image elements operates independently of moving means for at least a second one thereof, and a programming mechanism on the chassis sequentially and independently operates the moving means to move the additional image elements between the first and second positions thereof. The mechanism comprises a motor and transmission means for transferring drive motion from the motor to each of the moving means in sequence according to a predetermined mechanical program to effect such operation thereof; thus, the mechanism automatically displaces the additional image elements in accordance with the program during operation of the motor to selectively provide different presentations therewith.

Preferably, the image elements provide a multiplicity of display sets, each comprised of a plurality of image elements spaced across the device for simultaneous exposure to cooperatively provide a graphic presentation. The elements of each set which include one of the "additional" image elements are simultaneously movable therewith, by the associated moving means, between first and second positions of exposure and concealment.

Image elements of different ones of the display sets may be superposed upon one another to provide a multiplicity of adjacent, multi-ply arrays thereof, and most desirably, adjacent arrays overlap one another. It is especially desirable that the image elements be normally generally horizontally disposed and supported from above with their lower edges free. This will dispose the arrays in shingle-like fashion, with movement of each of the additional elements displacing it from an exposed position at the front of a first array to a concealed position behind the elements present in the array directly above it, thereby exposing the underlying image element in the first array. Each of the moving means may include at least one of a multiplicity of parallel, elongated support bars substantially constrained to axial movement and carrying at least one of the additional image elements. In such a case, the image elements are desirably thin, elongated strips which extend perpendicularly across the support bars. Preferably, each of the additional image elements is carried on at least two spaced support bars, to thereby substantially prevent angular disorientation of the image elements during movement thereof.

In particularly preferred embodiments of the invention, the programming mechanism includes, for each of the moving means, a pair of gear members having coacting portions thereon. The coacting portion of one of the gear members comprises a substantially uninterrupted array of teeth, and that of the other gear member includes at least a first cluster of teeth disposed for meshing engagement with the teeth of the one gear member. The other gear member also has a nonmeshibg zone adjacent the first cluster of teeth theron, and is driven from the motor to transmit power to the one gear member during only a portion of its operating cycle. The "other" gear members of the gear member pairs are advantageously fixedly mounted in axial alignment upon a common drive shaft, and are disposed with the first cluster of teeth of at least some of them angularly offset from one another about the drive shaft to provide the predetermined program; the first cluster of teeth of the "other" gear member of each pair may be adapted to rotate the "one" gear member through a complete revolution. Alternatively, the coacting portion of at least some of the "other" gear members may include a second cluster of teeth disposed for meshing engagement with the teeth of the "one" gear member, at a location circumferentially spaced from the first cluster and with a non-meshing zone therebetween. In such a case, each of the first and second clusters may desirably be adapted to rotate the "one" gear member through half a revolution, and the second clusters of teeth may be in axial alignment.

The transmission means employed in the device will normally include means for intermittently transferring power from the motor to a common drive shaft on which the "other" gear members are axially aligned and fixedly mounted. Such power transferring means may comprise at least one rotatably driven transfer member and at least one transfer pinion rotatably supported adjacent thereto for coaction therewith. The transfer member and transfer pinion will have coacting portions thereon, with the coacting portion of the transfer member comprising at least one toothed segment and on non-meshing segment adjacent thereto, and with the coacting portion of the transfer pinion comprising an array of teeth. The toothed segment of the transfer member will mesh with the teeth of the transfer pinion to transfer power to the latter during a portion of the cycle of operation of the former.

In certain preferred embodiments, the "other" gear member is of generally circular cross section with the teeth of its first cluster and with its non-meshing zone extending to a common arc circumscribing the gear member. The non-meshing zone thereof comprises an edge surface portion which provides a locking surface, the teeth of the gear member extend radially and are offset axially from the locking surface, and a recessed portion which is radially aligned with the locking surface and extends inwardly therefrom is provided adjacent the first cluster of teeth. The teeth of the "one" gear member extend radially thereof, and at least one of them is of lesser axial length than the others to provide a short tooth with a gap axially adjacent thereto. The "one" and "other" gear members are disposed with the short tooth radially aligned with the first cluster and with the gap radially aligned with the locking surface. The "other" teeth of the "one" gear member pass through the recessed portion of the "other" gear member during the power transmitting portion of the operating cycle, and two of the "other" teeth adjacent the short tooth tend to bear upon the locking surface as it passes through the gap during other portions of the operating cycle, thereby preventing rotation of the "one" gear member.

The transmission means may include a multiplicity of pivotally mounted lever members, each of which is connected to one of the moving means, and it may additionally include an action modifying linkage for each of the lever members. Such a linkage will have an element supported on the chassis for pivotal movement about a fixed point, with the lever member and the movable mounting means pivotally connected thereto at different points spaced from the fixed point. As a result, the lever member will act upon the moving means through the linkage element to modify the effect thereof. Preferably, the point of connection of the lever member to the linkage element is spaced from the fixed point a distance greater than the spacing of the moving means therefrom. This will increase the distance through which the moving means moves, as compared to the distance which direct connection of the moving means and the lever member would produce. Most desirably, the "one" gear member will have an axially projecting eccentric cam element disposed thereon, ahd the lever member will comprise a yoke member mounted adjacent thereto for pivotal movement about an axis parallel to the axis thereof. The yoke member will have an elongated slot dimensioned and configured to engage and cooperate with the cam element so as to convert rotary movement of the "one" gear member to oscillatory movement of the yoke member.

In a specific instance, the device includes at least three of the "additional" image elements and independently operable moving means for each. First clusters of teeth of the "other" gear members are disposed for operation of the independently operable moving means to return first of the additional image elements from the second position to the first position thereof, while simultaneously moving second of the additional image elements from the first position to the second position thereof. Thereafter, the teeth return the second additional image element from the second position to the first position thereof while simultaneously moving third of the additional image elements from the first position to the second position thereof. In another case, first clusters of teeth are disposed for operation of the independently operable moving means to sequentially move first, second and third of the "additional" image elements from the first positions to the second positions thereof. Second clusters of teeth thereafter simultaneously return the first, second and third image elements to the first positions. Finally, the chassis may have two sides with a multiplicity of image elements spaced across each side for exposure thereon.

BRIEF DESCRIPTION OF THE DRAWINGS

FIG. 6 is a side elevational view along line 6—6 of FIG. 3 of one picture bar operating yoke and the cam of the associated eccentric pinion;

FIG. 7 is a side elevational view along line 7—7 in FIG. 3 of the left end picture bar unit utilized therein, drawn to a somewhat enlarged scale from that of FIGS. 1 and 2 and showing the raised position of the unit in phantom line;

FIG. 10 is a view similar to FIG. 5, showing fewer parts and illustrating a different arrangement of the transfer teeth clusters so as to vary the program of operation of the device; and FIG. 11 is a fragmentary side elevational view in partial section, illustrating a second embodiment of the invention wherein a device having a two-sided display area is provided.

DETAILED DESCRIPTION OF THE ILLUSTRATED EMBODIMENTS

Figure 1:
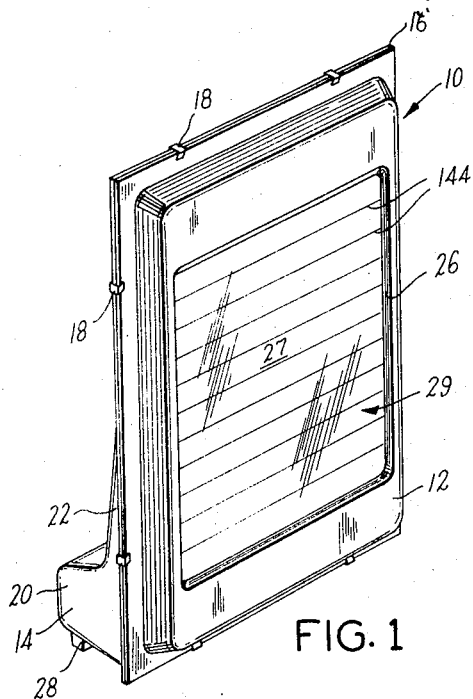
FIG. 1 is a perspective view of a programmed display device embodying the present invention.
Figure 2:
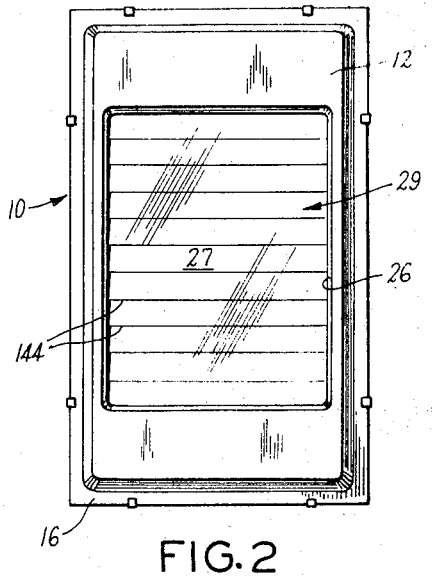
FIG. 2 is a front elevational view thereof.

Turning now in detail to FIGS. 1 to 9 of the appended drawings, therein illustrated is a programmed display device embodying the present invention and including a housing which is generally designated by the numeral 10 and consists of a front section 12 and a rear section 14. The sections of the housing 19 may conveniently be of vacuum-formed thermoplastic construction, and each is provided with a peripheral flange 16 extending entirely thereabout. The sections 12, 14 are assembled with the flanges 16 in face-to-face contact, and are secured together by small clips 18 which are springingly engaged over the flanges 16 at spaced locations thereabout. The clip 18 permit ready disassembly of the housing 10 for convenience in changing the graphic presentations, and elongated clips extending along the entire length of the flanges 16 may be used, if so desired. The rear section 14 has a rearwardly protruding lower portion 20 in which is enclosed picture bar operating mechanism, generally designated by the numeral 30, and an upwardly extending forward portion 22 which cooperates with the front section 12 to define a thin, rectangular upstanding enclosure 24 for the display assembly, generally designated by the numeral 29. The front section 12 of the housing 10 is desirably fabricated from a transparent material, and may have an opaque border (not shown) defining a rectangular viewing window 26 through which the outer surface 27 (i.e., the graphic presentation) of the display assembly 29 is exposed. The lower portion 20 of the rear section 14 has an elongated depending foot 28 extending thereacross, which cooperates with the flanges 16 along the bottom portion of the housing 10 to support it in a stable, upright position.

Figure 3:
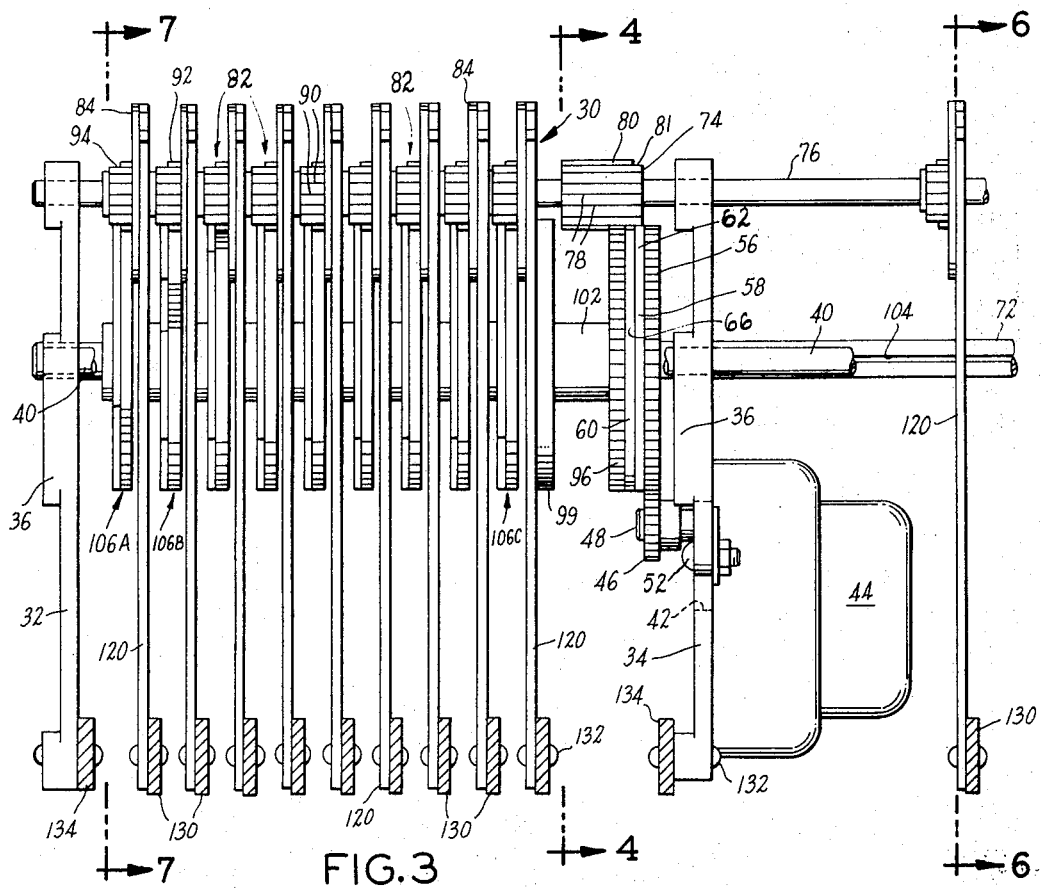
FIG. 3 is a top plan view of the left section of the picture bar operating mechanism of the device of the preceding figures, drawn to a greatly enlarged scale.
Figure 4:
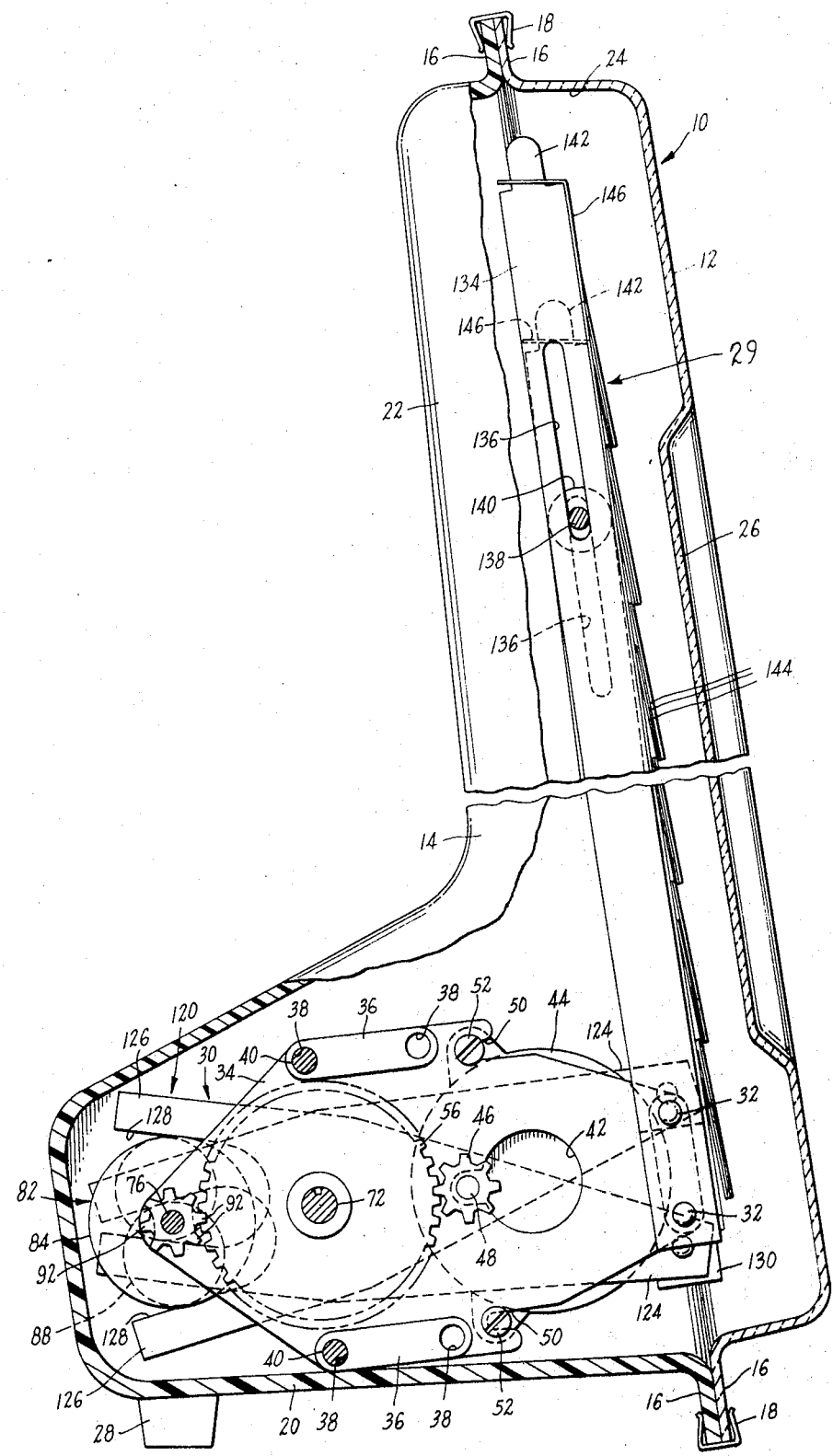
FIG. 4 is a fragmentary side elevational view of the device, partially in section along line 4—4 of FIG. 3 and drawn to the scale thereof.
Figure 9:
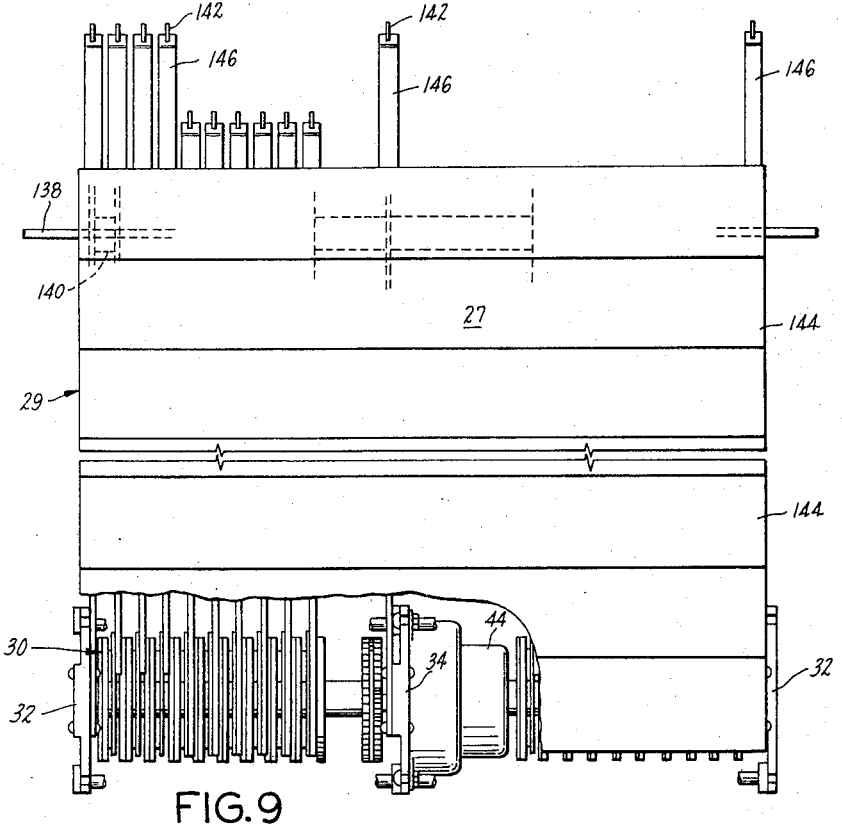
FIG. 9 is a fragmentary front elevational view of the device drawn to the scale of FIG. 8 with the housing removed and with image elements broken away to illustrate the internal mechanism thereof.

The picture bar operating mechanism 30 is most clearly illustrated in FIGS. 3 and 9, and is supported between a pair of side plates 32, which are fastened to the walls of the rear section 14 of the housing 10 by appropriate means (not illustrated). A motor mount 34 is of similar construction to the side plates 32 and cooperates therewith to provide central support for the mechanism 30. The side plates 32 and motor mount 34 are provided with narrow reinforcing pads 36 which extend along the top and bottom margins thereof and have pairs of mounting apertures 38 extending therethrough. The rearmost aperture 38 of each pad receives one of the tie bars 40 which extend from side-to-side across the housing 10 to provide primary support for the picture bar operating mechanism 30, and the other apertures 38 are adapted to receive the fastening means for securing the side plates 32 within the housing 10, as previously mentioned. The motor 44 is mounted on one side of the motor mount 34 with its drive pinion 46 on the opposit side thereof and with the shaft 48 passing through the keyhole slot 42. Adjacent its upper and lower edges the motor mount 34 has a pair of short slots 50 which receive motor fastening bolts 52, enabling the motor 44 to be replaced simply by loosening the bolts 52, sliding the motor 44 forwardly, and withdrawing the drive pinion 46 through the enlarged portion of the keyhole slot 42.

Figure 5:
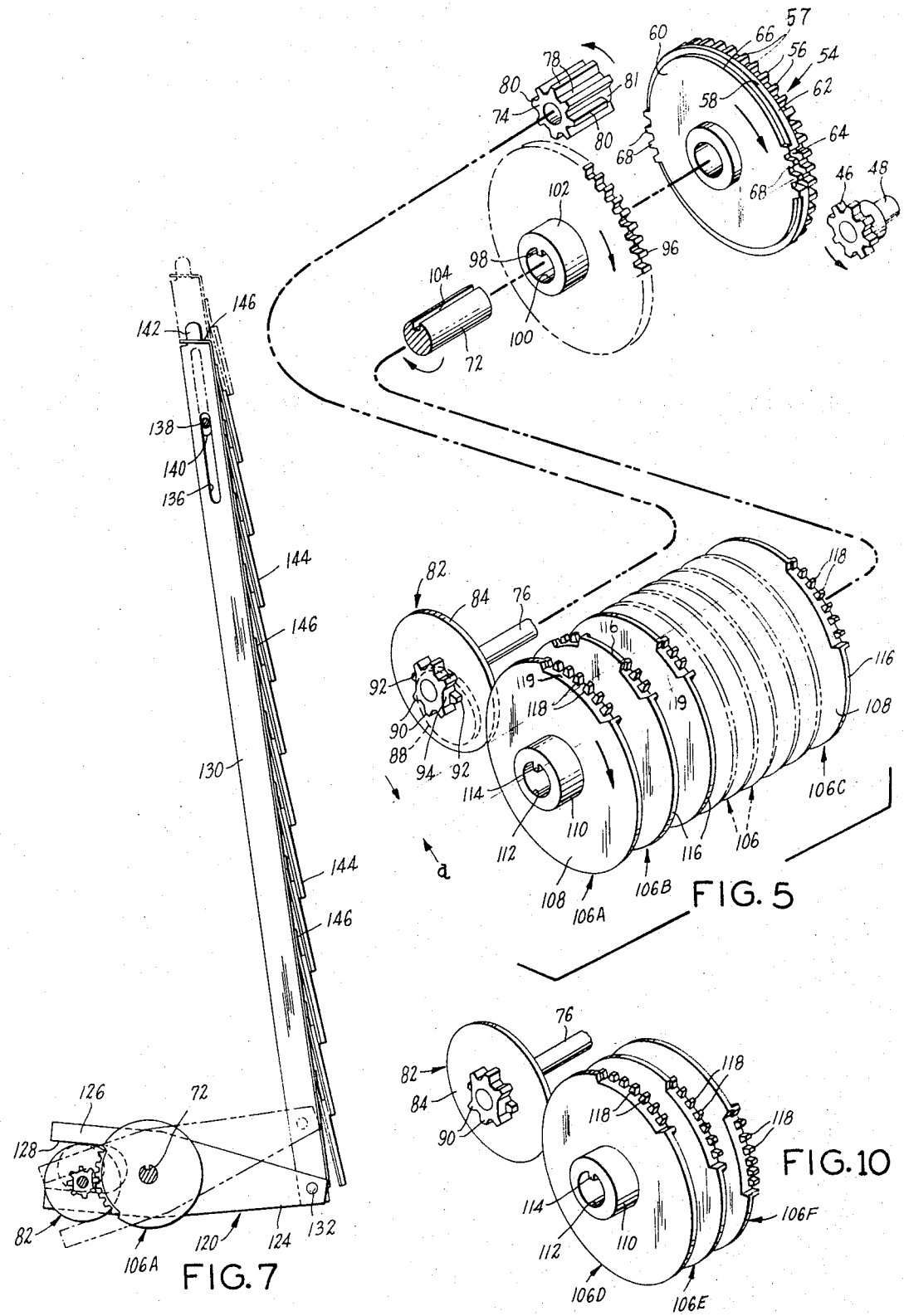
FIG. 5 is a fragmentary exploded perspective view of parts of the yoke-operating mechanism utilized in the section of the picture bar operating mechanism shown in FIG. 3.

The picture bar yoke-operating mechanism is most clearly illustrated in FIG. 5, to which detailed reference is now made. A multiunit, generally designated by the numeral 54, is mounted for free rotation adjacent the motor 44 with the main drive shaft 72 passing through the central aperture 70 thereof. The multiunit 54 consists of a driven gear element 56, a locking ring element 58, and a transfer element 60, which are affixed to one another and preferably may be integrally formed. Each element of the multiunit 54 has portions extending to a common imaginary surface or arc extending circumferentially thereabout, including the tips of the teeth 57 of the gear element 56, the locking surface 62 of the locking ring element 58, and the tips of the eight teeth 68 of the transfer element 60. The transfer element teeth 68 are divided into two groups or clusters which are diametrically disposed on the multiunit; between the clusters of teeth 68 extend circumferential rcessed portions 66 and adjacent to each cluster is a notch 64 extending radially inwardly from the locking surface 62 of the locking ring element 58.

An elongated transfer pinion 74 is mounted for free rotation upon a support shaft 76 adjacent the multiunit 54 for coaction therewith. The transfer pinion 74 has six long teeth 78 and two diametrically disposed short teeth 80 which extend to points spaced inwardly from the right-hand end of the pinion 74, and provide gaps 81 thereat. In assembly (note FIG. 3), the locking ring element 58 is radially aligned with the right end of the pinion 74 so that the locking ring element may pass through one of the gaps 81, with the edges of the adjacent long teeth 78 bearing upon the locking surfaces 62 and with the corner of short tooth 80 thereat riding in one of the recesses 66. Hence, during the major portion of the cycle of rotation of the multiunit 54 the transfer pinion 74 is locked against rotation, and no tooth of the transfer element 60 engages any tooth thereof. When a cluster of teeth 68 on the transfer element 60 and the adjacent notch 64 in the locking ring element 58 are presented to the transfer pinion 74, the multiunit drives the transfer pinion 74 with interference being avoided by the accommodation of the long teeth 78 thereof within the notch 64. Each cluster of teeth 68 rotates thé transfer pinion 74 through half a revolution; since there are two such clusters on the multiunit 54, each revolution of the multiunit 54 causes a complete revolution of the transfer pinion 74, with continuous rotation thereby being converted to intermittent movement. In the specific embodiment illustrated, the driven gear element 56 has forty teeth, causing the transfer pinion 74 to idle during four-fifths of the cycle of the revolution of the multiunit 54.

As is most clearly seen in FIG. 3, a multiplicity of eccentric pinions, generally designated by the numeral 82, are mounted for free rotation upon the support shaft 76 adjacent to one another. All of the eccentric pinions 82 are of identical construction and consist (note particularly FIG. 5) of a disk 84 having a central aperture 86 receiving the support shaft 76. On one side of the disk 84 is an eccentric lobe or cam 88, and a gear element consisting of six long teeth 90 and two diametrically disposed short teeth 92 is provided on the opposite side thereof. Gaps 94 are defined between the long teeth 90 which are adjacent to each of the short teeth 92.

On the main drive shaft 72 adjacent to the multiunit 54 is provided a drive gear 96 which has a centrally located spacing hub 102 extending from one side thereof with a shaft-receiving aperture 100 passing therethrough. Extending inwardly from the sidewall of the hub 102 is a short key 98, which is received in the keyway 104 extending longitudinally along the drive shaft 72. Adjacent to the drive gear 96 is an annular spacer 99 and a bank of drivers generally designated by the numeral 106, the first two and the last driver of the bank being designated 106A, 106B, and 106C, respectively to facilitate specific reference thereto. As can best be seen in FIG. 9, two such banks of drivers 106 are employed; since the right-hand bank duplicates the operation of the left-hand bank and employs elements which are substantially identical thereto, only the left bank will be described in detail hereinafter.

Each driver 106 consists of a circular body 108 with a centrally located spacing hub 110 extending axially from one side thereof. A central aperture 112 passes axially through the driver 106, and a short key 114 extends radially into the aperture 112 for engagement in the keyway 104 to prevent relative rotation of the drivers 106 on the shaft 72. Extending circumferentially about the body 108 is a locking surface 116 which is interrupted by teeth 118. The teeth 118 are slightly offset axially from the locking surface 116 and are arranged in groups or clusters about the circumference of the body 108, with the locations of the clusters relative to one another and to the key 114 constituting the only significant difference among the various pinion drivers 106. As can be seen in FIG. 5, all drivers 106 have a base or return cluster of teeth 118 (i.e., those lying within the imaginery row a) with a center line disposed in each instance at the same angular relationship to the key 114. The remaining four teeth 118 of each driver 106 constitute a shift cluster, having a center line that is displaced from that of the return cluster by a multiple of 36 degrees. Since each cluster also encompasses an arc of 36 degrees, in driver 106A, which has a center line displacement multiple of one, all eight teeth lie adjacent to one another and encompass a total arc of 72 degrees. The centerline displacement multiple of driver 106B is two (i.e., 72 degrees), resulting in the presence of a 36-degree arc portion of the locking edge surface 116 between the clusters thereof. As will be appreciated, subsequent drivers 106 of the bank have clusters of teeth 118 which are displaced by 108, 144, 180, 216, 252 and 288 degrees, until in driver 106C the displacement of 324 degrees again brings all teeth 118 together but at an angular relationship to the key 114 which is 36 degrees removed from that of driver 106A.

The eccentric pinions 82 are mounted on the shaft 76 with the circumferential locking surface 116 of the associated pinion driver 106 positioned to pass through the gaps 94 adjacent the short teeth 92 thereof. Rotation of the shaft 72 brings the teeth 118 of the pinion drivers 106 into meshing engagement with the teeth 90, 92 of the coacting eccentric pinion 82, causing rotation of the pinions 82 upon the shaft 76. As will be apparent, the pinions 82 and drivers 106 coact in substantially the same way as do the multiunit 54 and transfer pinion 74. Thus, through most of the cycle of revolution of each driver 106 the associated pinion 82 is locked against rotation by engagement of the locking surface 116 upon the long teeth 90 adjacent the gaps 94; upon engagement of the teeth 118, the notch 119 adjacent thereto accommodates the portions of the teeth 90 radially aligned therewith.

Each set of an eccentric pinion 82 and a cooperating pinion driver 106 has associated with it a picture bar operating lever or yoke, generally designated by the numeral 120 and most clearly illustrated in FIG. 6. The yoke 120 has an elongated body 122 with a tapered forward nose portion 124 and a bifurcated rear-end portion defining a U-shaped slot 128 between the legs 126 thereof. The forward nose portion 124 is secured to the lower end of a picture bar 130, such as by a small stud or pin 132, and the body 122 has a centrally located aperture 134 in which is received the main drive shaft 72. It will be noted that the yoke 120 has no key for engagement in the keyway 104, and is therefore free to pivot upon the drive shaft 72 rather than being driven thereby. The U-shaped slot 128 is configured to receive the lobe or cam 88 eccentrically disposed on the associated eccentric pinion 82, rotation of which will therefore oscillate the yoke 120 on the shaft 134.

The manner of operation of the picture bar operating mechanism is as follows. The multiunit 54 rotates continuously through meshing engagement of its driven gear element 56 with the drive pinion 46 of the motor 44. When rotation of the multiunit 54 brings a cluster of teeth 68 of the transfer element 60 into engagement with the teeth 78,80 of the transfer pinion 74, the latter rotates 180 degrees. This occurs twice during each revolution of the multiunit 54, producing a full revolution of the transfer pinion 74 during each revolution of the multiunit 54; of course, whereas rotation of the multiunit 54 is continuous, that of the transfer pinion 74 is intermittent.

Meshing engagement with the transfer pinion 74 causes intermittent rotation of the drive gear 96, which in turn imparts such movement to the drive shaft 72 and to the banks of pinion drivers 106 thereon. Although all of the pinion drivers 106 move simultaneously, the placement of the clusters of teeth on the circumference thereof results in movement of the associated eccentric pinions 82, and hence of the yokes 120, at different times. In the illustrated embodiment of FIGS. 1 to 9, movement is in accordance with the following program.

Assuming rotation to be in the directions indicated in FIG. 5, the reset clusters of teeth 118 (i.e., those aligned within the row designated a) of all drivers 106 will simultaneously engage the associated eccentric pinions 82 to rotate them through half a turn. As a esult, each yoke 120 will be in its base position, which is with the forward end down; this is illustrated with respect to driver 106A in full line in FIG. 7. When a cluster of teeth 64 on the multiunit 54 next engages the transfer pinion 74, to rotate the drive shaft 72 through 36 degrees, the second or shift cluster of teeth 118 on driver 106A (which are in that instance directly adjacent the base cluster) will rotate the coacting pinion 82 through the second half revolution, shifting the yoke 120 to the up position shown in phantom line in FIG. 7. During this time, although all other drivers 106 are moving, locking surfaces 116 are presented to their associated pinions 82, thus maintaining the other yokes 120 in their base positions. Upon the next half revolution of the multiunit 54, the resulting 36-degree turn of the shaft 72 brings the shift cluster of teeth 118 on driver 106B into engagement with its eccentric pinion 82, shifting the yoke 120 engaged therewith to the up position. As will be appreciated, each of the drivers 106 will, in like manner, move its associated pinion 82 and yoke 120 to the shift position, with those previously shifted being maintained in the raised position by engagement of the locking surfaces 116. After four and one-half revolutions of the pinion 74, the drivers 106 will again be positioned to return all of the yokes 120 to the down position in a smooth and controlled manner upon the next half turn of the pinion, completing one full revolution of the shaft 72.

Figure 8:
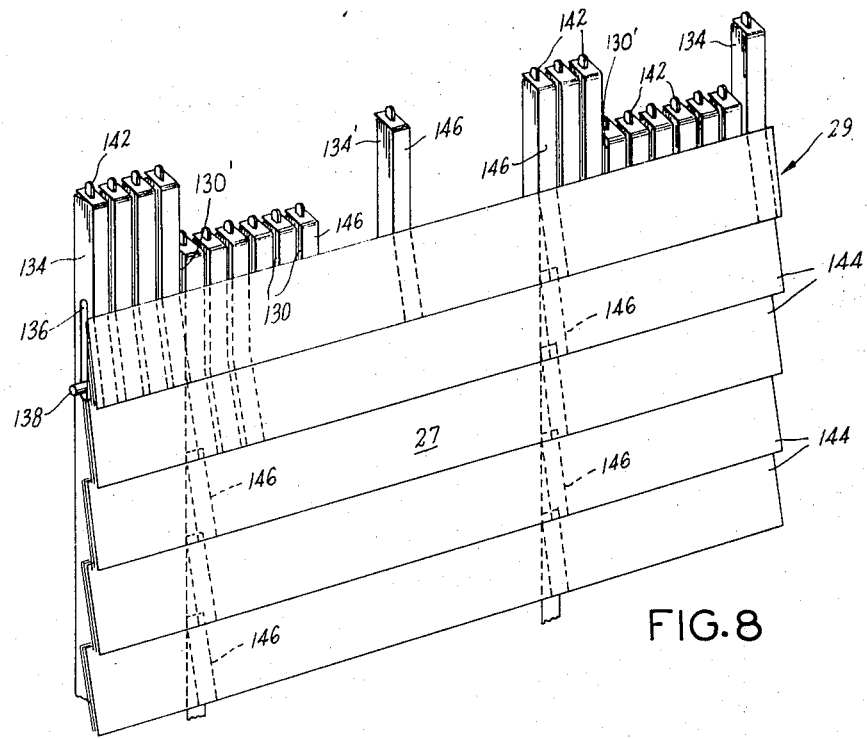
FIG. 8 is a fragmentary perspective view of the display assembly utilized in the present device, drawn to the scale of FIG. 7.

Turning now to FIGS. 8 and 9 in particular, the display assembly, generally designated by the numeral 29, consists of a multiplicity of axially movable picture bars 130 positioned between stationary bars 134 located at each end and in the center thereof, the bars 130, 134 conveniently being of thin metal strip construction. As can be seen, the bars 130, 134 are parallel to one another; the movable bars 130 are supported for upward and downward reciprocation of the associated yoke 120 (which is affixed to the end thereof in the manner previously described), and stationary bars 134 are fixedly mounted upon the plates 32 and the motor mount 34 (the latter mounting being clearly illustrated in FIG. 4). An axially extending elongated slot 136 is provided adjacent the upper end of each bar 130, 134, and a tie rod 138 extends transversely across the display assembly 29 through slots 138 and is secured in the sides of the housing 10 by appropriate means (not illustrated). The picture bars 130 may be shifted between their upper and lower positions with the tie rod 138 and the spacers 140 therebetween constraining the bars 130 to axial movement and maintaining them in the proper relationship. Each of the picture bars 130, 134 has a short tab 142 extending axially from its upper end; the tabs 142 are configured to engage in slits (not visible) which are provided through one end of each of the hangers 146, from the oppostie ends of which depend the image elements or slats 144 providing the exposed graphic presentation 27.

As is seen in FIG. 8, the display assembly 29 includes a multiplicity of slats 144 which extend perpendicularly across the picture bars 130, 134. The slats 144 are arranged in shingle fashion as overlapping tiers; each tier consists of a stack of slats 144 disposed one behind the other, and one slat 144 in each tier cooperates with slats of the other tiers residing at the same relative location within the stack to define a single graphic presentation. Thus, the forward slats 44 which are exposed in FIGS. 8 and 9 provide a first graphic presentation 27; the next layer of slats in the stacks combine to provide a second presentation (which would be visible upon displacement of the slats providing presentation 27), and so on throughout each layer.

The movable slats 144 are supported at each end by a hanger 146 attached to one of a pair of picture bars 130 disposed to opposite sides of the central stationary bar 134' and all slats 144 which constitute a specific presentation are supported by the same pair of picture bars 130. More specifically, the slats 144 for the exposed presentation 27 are all supported by picture bars 130'. As will be appreciated, shifting the bars 130' to their upper positions will draw the exposed slats 144 from the locations shown, to concealed locations behind the slats in the next higher tier, placing the withdrawn slats 144 on the bottom of the stacks and exposing the underlying presentation.

From the foregoing, the manner in which the picture bar operating mechanism 30 can be utilized to provide a programmed display of a variety of pictures or other graphic presentations will be readily understood. With all yokes 120 in the lowered or base position, the slats 144 supported upon the picture bars 130 associated with eccentric pinion driver 106 A are positioned for viewing. The next 36° revolution of the drive shaft 72 shifts the yoke 120 of FIG. 7 and the corresponding yoke of the right-hand bank to the upper (phantom line) position, raising the slats attached to the first set of picture bars 130 to positions under the tiers directly above, thereby exposing the underlying set of slats 144. During the subsequent revolution, the second set of picture bars 130 is shifted upwardly while the first set is maintained in its elevated position, thus shifting the then exposed set of slats to a concealed location and exposing the next layer of slats. In this manner, the sets of slats are individually displaced until all movable slats have been raised to their elevated positions. To provide the final display of the series, a set of fixed slats may be attached to the stationary picture bars 134 so that at the end of the cycle all of the movable slats 144 are concealed therebehind, and the outermost slat of the top tier will also generally be stationary and blank to provide a uniform border portion. Upon continued operation, the movable slats 144 are simultaneously lowered to their original positions to recommence operation and to thereby provide a dynamic display of continually changing graphic presentations. It is significant to note that during the entire cycle of operation movement is disciplined, and that each display unit operates independently of the others. This enhances the smoothness of operation and permits wide variation of the program employed.

To illustrate one possible program variation, the modified eccentric pinion drivers 106 shown in FIG. 10 might be utilized to produce a different mode of operation. As will be readily observed, all of the teeth 118 of each driver 106D, 106E and 106F of FIG. 10 are adjacent to one another to effectively provide a single cluster of eight teeth, as in drivers 106A and 106C of FIG. 5. The drivers 106 of FIG. 10 differ from one another only in that the tooth clusters are disposed at different angles relative to the keys 114 thereon, which in turn disposes them along a helical path about the shaft 72. With the illustrated arrangement, each of the eccentric pinions 82 will make a complete (although discontinuous) rotation during two successive moves of the shaft 72 and then be idle for the remaining period. This is to be contrasted with the sequence of movement of the pinions of the previously described embodiment, wherein, in most instances, rotation of any given pinion (other than the first and last to act) did not occur upon successive moves of the shaft 72. Because the following four teeth 118 of each cluster are axially aligned with the leading four of the cluster of the adjacent driver 106, when the pinion 82 of one driver 106 pivots its associated yoke 120 to an upward position, the pinion 82 of the adjacent driver 106 will simultaneously pivot its yoke 120 to a downward position. Accordingly, the effect will be one of shifting the slats 144 past one another rather than of simply withdrawing a single set of slats, thereby creating an illusion of greater activity, as may be desired in certain instances.

More specifically, as depicted in FIG. 10 driver 106F will raise the yoke 102 with which it is associated before either of the drivers 106D, 106E operates its associated pinion 82. During the successive 36° revolution of the shaft 72, the yoke 120 associated with driver 106F will be lowered while the yoke associated with the driver 106E is simultaneously raised. Thereafter, the yoke of the 106E driver will move downwardly while the yoke of the 106D driver is moved to its upper position, and so on for the entire bank of drivers.

Turning finally to FIG. 11, therein illustrated is a second embodiment of the invention wherein two sets of display slats are supported on each support member to simultaneously expose two graphic presentations on opposite sides of the device. The enclosure 154 is fabricated of a transparent material to permit viewing, and border elements 157 are provided therein to define appropriate frames about the viewing areas. In this instance the housing, which is generally designated by the numeral 150, consists of a base 152, an upstanding enclosure 154 supported thereon, and an elongated U-shaped cap 156 covering the upper end. The picture bars 130 support straps or hangers 158, which have elements depending on both sides thereof and which support a multiplicity of display slats 144 for viewing on opposite sides of the device.

The embodiment of FIG. 11 also includes a distance-multiplying mechanism, which consists essentially of a link 160 that is pivotally supported at one end by an appropriate shaft 162 mounted within the base 152. The link 160 pivotally engages the lower end of a picture bar 130 at its opposite end and has an elongated slot 164 centrally disposed thereon, in which is receivrd a pin 132 secured in the forward nose portion 124 of an associated yoke 120. Other portions of the mechanism illustrated are comparable to those previously described. As will be readily appreciated, because the yoke 120 is attached midway between the ends of the link 160, the end thereof that engages the picture bar 130 will move through a distance which is double that through which the forward end 124 of the yoke moves. The resultant multiplied motion permits the use of slats 144 which are of a double width without altering the cycle time to accommodate the greater distance which must be traversed, thereby permitting the dimensions of the display assembly to be readily increased in a very desirable manner.

It will be appreciated that many changes may be made in the present device without departing from the concept of the invention. For example, although the illustrated device has two banks of eccentric pinions and associated drivers to enable the use of a pair of picture bars to support each display set, this number may be increased to provide further stability for the elements of the display sets or to accommodate larger displays. Conversely, a single picture bar or other support member may be employed for each set of image elements, albeit with an increased tendency for disorientation of the elements to occur. Moreover, while only a single multiunit and cooperating transfer pinion are used in the illustrated embodiments, it is entirely feasible to utilize a number of such sets in series to greatly extend the cycle of operation, as may be desired to permit changes on an hourly or daily basis. As will be appreciated, the two different arrangements of teeth on the drivers which have been illustrated by no means exhaust the numerous possibilities, and methods of producing additional variations in operation by different teeth arrangement and by other means will be readily apparent to those skilled in the art. For example, by changing the relationships of the eccentric pinions and drivers in the illustrated devices, the shift positions may be below rather than above the base positions of the display sets, and very interesting effects can be created by adapting certain sets for movement in opposed directions. In addition, it is not necessary that the slats 144 operate as complete sets or that more than one tier contain movable slats; the slats may move individually from several or only a single tier, although the types of devices illustrated will generally be preferred.

Thus, it can be seen that the present invention provides a novel display device which is capable of selectively exposing a variety of graphic presentations in sequence according to a determined program. The device may operate automatically or semi-automatically (such as by manually pulsed activation and deactivation of the motor, as desired), and change of the display may occur continuously or intermittently, with each presentation being maintained in a stationary position for a predetermined portion of a cycle of intermittent operation. The device is flexible in its applications; it is adapted for a wide variety of displays, and may be used to create highly unique and attractive visual effects. It is compact and effective, smooth and well-controlled in operation, the elements providing the graphic presentations may be readily replaced, and the device is adapted for wide variation of its program to vary the mode of operation in a highly desirable manner.

Having thus described the invention, I claim:

1. In a programmed display device, the combination comprising:
    a. a chassis;
    b. a multiplicity of first generally planar image elements spaced across said chassis;
    c. a plurality of additional generally planar image elements movably mounted on said chassis, each of said additional image elements being superposed over at least one of said first image elements in a first position in which said additional image element is exposed to provide, in cooperation with other exposed image elements, a first graphic presentation and in which said one image element is substantially concealed thereunder;
    d. means for moving each of said additional image elements between said first position thereof and a second position in which said additional image element is concealed under another of said first image elements and said one image element concealed thereunder in said first position is exposed to provide, in cooperation with other exposed image elements, an additional graphic presentation, the moving means for at least one of said additional image elements operating independently of moving means for at least a second one thereof; and
    e. a programming mechanism on said chassis for sequentially and independently operating said moving means to move said additional image elements between said first and second positions thereof, said mechanism comprising a motor and transmission means for transferring drive motion from said motor to each of said moving means in sequence according to a predetermined mechanical program to effect such operation thereof, said mechanism automatically displacing said additional image elements in accordance with said program during operation of said motor to selectively provide different presentations therewith, said transmission means including, for each of said moving means, a pair of gear members having coacting portions thereon, the coacting portion of one of said gear members comprising a substantially uninterrupted array of teeth and the coacting portion of the other of said gear members including at least a first cluster of teeth disposed for meshing engagement with the teeth of said one gear member, said other gear member having a non-meshing zone adjacent said first cluster of teeth, said other gear members for each of said moving means being mounted upon a common drive shaft and being driven simultaneously by said motor to transmit power to said one gear members during only a portion of the operating cycle of said other gear members, said transmission means further including means coupling said one gear member to one of said moving means to translate the intermittent rotary motion thereof to motion of the cooperating image element.

2. The device of claim 1 wherein said image elements provide a multiplicity of display sets, each set being comprised of a plurality of said image elements spaced across said device for simultaneous exposure to cooperatively provide a graphic presentation, the image elements of each of said sets which include one of said additional image elements being simultaneously movable therewith by the associated moving means between first and second positions of exposure and concealment.

3. The device of claim 2 wherein image elements of different ones of said display sets are superposed upon one another to provide a multiplicity of adjacent, multiply arrays thereof.

4. The device of claim 3 wherein adjacent arrays of image elements overlap one another.

5. The device of claim 4 wherein said image elements are normally generally horizontally disposed and are supported from above with their lower edges free, said arrays of elements being disposed in shingle-like fashion with movement of each of said additional elements displacing it from an exposed position at the front of a first array to a concealed position behind at least one image element directly thereabove, thereby exposing the underlying image element in said first array.

6. The device of claim 1 wherein each of said moving means includes at least one of a multiplicity of parallel, elongated support bars carrying at least one of said additional image elements, and wherein said image elements are thin, elongated strips extending perpendicularly across said support bars, said support bars being substantially constrained to axial movement.

7. The device of claim 6 wherein each of said additional image elements is carried on at least two spaced support bars to substantially prevent angular disorientation of said elements during movement thereof.

8. The device of claim 1 wherein said other gear members of said pairs are fixedly mounted in axial alignment upon said common drive shaft, with said first cluster of teeth of at least some of said other gear members being angularly offset from one another about said drive shaft to provide said predetermined program.

9. The device of claim 8 wherein eaid first cluster of teeth of said other gear member of each of said pairs is adapted to rotate said one gear member thereof through one complete revolution.

10. The device of claim 9 wherein said device includes at least three of said additional image elements and independently operable moving means for each, and wherein said first clusters of teeth of said other gear members are disposed for operation of said independently operable moving means to return first of said additional image elements from said second position to said first position thereof while simultaneously moving second of said additional image elements from said first position to said second position thereof, and to thereafter return second of said additional image elements from said second position to said first position thereof while simultaneously moving third of said additional image elenents from said first position to said second position thereof.

11. The device of claim 8 wherein said coacting portion of at least some of said other gear members includes a second cluster of teeth disposed for meshing engagement with said teeth of said one gear member at a location circumferentially spaced from said first cluster and with a non-meshing zone therebetween.

12. The device of claim 11 wherein each of said first and second clusters is adapted to rotate said one gear member through half a revolution.

13. The device of claim 11 wherein said second clusters of teeth of said other gear members are in axial alignment.

14. The device of claim 11 wherein said device includes at least three of said additional image elements and independently operable moving means for each, and wherein said first clusters of teeth of said other gear members are disposed for operation of said independently operable moving means to sequentially move first, second and third of said additional image elements from said first positions to said second positions thereof, and wherein said second clusters of teeth are disposed to thereafter simultaneously return said first, second and third image elements to said first positions thereof.

15. The device of claim 8 wherein said transmission means includes means for intermittently transferring power from said motor to said common drive shaft.

16. The device of claim 15 wherein said transferring means comprises at least one rotatably driven transfer member and at least one transfer pinion rotatably supported adjacent thereto for coaction therewith, said transfer member and said transfer pinion having coacting portions thereon, the coacting portion of said transfer member comprising at least one toothed segment and one non-meshing segment adjacent thereto, and the coacting portion of said transfer pinion comprising an array of teeth, said toothed segment meshing with the teeth of said transfer pinion to transfer power thereto during a portion of the cycle of operation of said transfer member.

17. The device of claim 1 wherein said other gear member is of generally circular cross section with the teeth of said first cluster and with said non-meshing zone extending to a common arc circumscribing said other gear member, said non-meshing zone comprising an edge surface portion of said other gear member and providing a locking surface thereon, said teeth extending radially and being offset axially from said locking surface and said gear member having a recessed portion adjacent said first cluster radially aligned with said locking surface and extending inwardly therefrom, and wherein said teeth of said one gear member extend radially thereof with at least one of said teeth being a short tooth of lesser axial length than the other teeth thereof to provide a gap axially adjacent thereto, said one and other gear members being disposed with said short tooth radially aligned with said first cluster and with said gap radially aligned with said locking surface, said other teeth of said one gear member passing through said recessed portion of said other gear member during said power transmitting portion of said operating cycle and two of said other teeth adjacent said short tooth tending to bear upon said locking surface as it passes through said gap during other portions of said operating cycle to prevent rotation of said one gear member.

18. The device of claim 1 wherein said coupling means of said transmission means includes a multiplicity of pivotally mounted lever members each connected to one of said moving means and to the cooperating one of said one gear members.

19. The device of claim 18 wherein said transmission means additionally includes an action modifying linkage for each of said lever members, said linkage having an element supported on said chassis for pivotal movement about a fixed point and having said lever member and said movable mounting means pivotally connected thereto at different points spaced from said fixed point, said lever member thereby acting upon said moving means through said linkage element to modify the effect thereof.

20. The device of claim 19 wherein the point of connection of said lever member to said linkage element is spaced from a fixed point a distance greater than the spacing of said moving means therefrom, thereby increasing the distance through which said moving means moves, as compared to the distance which direct connection of said moving means and said lever member would produce.

21. The device of claim 18 wherein said one gear member has an axially projecting eccentric cam element disposed thereon and wherein said lever member comprises a yoke member mounted adjacent said one gear member for pivotal movement about an axis parallel to the axis thereof, said yoke member having an elongated slot in which said cam element is engaged, and said slot being dimensioned and configured to cooperate with said cam element so as to convert rotary movement of said one gear member to oscillatory movement of said yoke member.

22. The device of Claim 1 wherein said chassis has two sides, and wherein a multiplicity of said image elements are spaced across each of said sides of said chassis for exposure thereon.

* * * * *